Patented Dec. 14, 1948

2,456,351

UNITED STATES PATENT OFFICE 2,456,351

ACTIVATION OF CATALYST

Albert B. Welty, Jr., Mountainside, and Clinton H. Holder, Cranford, N. J., assignors to Standard Oil Development Company, a corporation of Delaware No Drawing. Application August 10, 1946, Serial No. 689,813

2 Claims. (Cl. 260—668)

Our invention relates to the novel features disclosed in the following specification and claims. Prior to the present invention it was known that zinc-alumina spinel ($ZnAl_2O_4$) was a more satisfactory base or spacing agent for a number of catalysts which were commonly employed in such reactions as hydrogenations, oxidations, reforming, aromatizations and the like. Prior to the discovery of the use of zinc spinel as a carrier or support for active catalyst, various forms of alumina had been employed. Thus, for example, so-called "activated alumina" had been used as a support for a large number of active catalysts. However, as indicated, it was found that zinc spinel was much superior for this purpose. Thus, for example, in the reforming of naphthas using a metal oxide of the V or VI group of the periodic system such as molybdenum oxide or chromium oxide higher yields of aromatics were obtained than when employing the alumina base or carrier. It was further found that during the regeneration of the catalyst following use in the productive phase, the regeneration which invariably involves burning off contaminants might be conducted at a higher temperature, in the case of zinc spinel base, then was possible using the alumina type base without injuring the catalyst. Consequently, studies with the catalyst containing the zinc spinel base clearly showed that the latter was much superior to those employing the alumina or other types of bases.

We have now found that a catalyst containing a zinc spinel base or spacing agent may be still further improved if during the preparation of the catalyst the same is calcined for the purpose of activating it, within a restricted temperature range.

The main object of our present invention has to do with improvements in the preparation of a composite catalyst containing a zinc spinel base or spacing agent.

A more limited object of our invention relates to improving the activity of a composite catalyst containing an active catalytic component and zinc spinel base.

Other and further objects of our invention will appear from the following description and claims.

In order to illustrate our invention we set forth below specific examples describing methods embodying our present improvements:

Example 1

Solution A.—974 g. of C. P. zinc nitrate ($Zn(NO_3)_2.6H_2O$) was dissolved in a solution of 179 cc. concentration nitric acid in two liters of distilled water and made up to a volume of 3290 cc.

Solution B.—80 g. of pure NaOH was dissolved in four liters of distilled water. 800 g. of sodium aluminate was stirred in rapidly. After stirring for two minutes, 500 cc. of "Super Hyflo" (a diatomaceous earth filter aid) was added. Stirring was continued for one-half minute and the suspension was filtered on a Buchner funnel. 3290 cc. of the filtrate was used for solution B. The resulting solution had a concentration of 101 g. $Al_2O_3$ and 87 g. $Na_2O$ per liter. On this basis, the acidity of the zinc nitrate (solution A) was adjusted to neutralize exactly the alkali of the alumina solution.

Solutions A and B were added at equal rates over a period of 30 minutes to 10 liters of distilled water while stirring. Stirring was continued for fifteen minutes after all of A and B had been added and the precipitate filtered. The precipitate was washed with six liters $H_2O$, restirred in twelve liters of water, and filtered and washed with six liters $H_2O$. The precipitate was dried and calcined three hours at 1000° F.

The zinc aluminate was mixed for three hours in a ball mill with a solution of 81.8 g. of C. P. ammonium molybdate dissolved in a solution of 44 cc. concentrated ammonium hydroxide in 440 cc. $H_2O$. (Additional water was added, sufficient to form a thick paste before mixing.) The mixture was dried, pilled and calcined.

Example 2

Another catalyst was prepared as above except that the washed zinc aluminate precipitate was not dried and calcined before mixing with the ammonium molybdate solution.

Example 3

Aluminum hydroxide was prepared by adding 1645 cc. of a solution, identical with solution B in Example 1, to eight liters distilled water and then adding a solution of 295 cc. concentrated nitric acid in four liters distilled water. The precipitate was filtered and washed with five liters of distilled water.

409 g. of fused zinc nitrate (32.5% ZnO) was dissolved in five liters of water and neutralized by stirring in a solution of 135 g. of sodium hydroxide in one liter of water. The precipitate was filtered, washed with three liters of distilled water and mixed with four liters of distilled water. This failed to give a clear solution and was mixed with the aluminum hydroxide precipitate above. The mixture was filtered and washed on the filter with three liters of water. It was mixed for three hours in a ball mill, dried and calcined.

The product was impregnated with ammonium molybdate (40.9 g.) and finished as in Example 1.

Catalyst prepared according to the procedure of Example 1 was tested to determine the effect of heat activation by passing a fraction of virgin naphtha containing naphthenes boiling between 200° and 270° F. in some five runs at a feed rate of 1.3 volumes of feed per volume of catalyst per hour, with 1500 cubic feet of hydrogen per barrel of oil while maintaining a temperature of 900° F. and a pressure of 200 lbs. per sq. inch through a reaction zone containing the calcined catalyst. The only difference in the several runs was with respect to the method in which the catalyst was activated by a calcination or heat treatment prior to use, or in other words the catalyst in column A was calcined by heating 3 hrs. at 1150° F., in B at 1300° F. for 6 hrs., in C, D and E at 1400° F. for 3, 6 and 12 hrs. respectively. The results appear in the table below.

*Heat activation of catalyst*

| Catalyst Treatment | Yield of Aromatics in vol. percent | | | | |
|---|---|---|---|---|---|
| | 1150° F., 3 Hrs. | Dry N₂ Stream | | | |
| | | 1300° F., 6 Hrs. | 1400° F. | | |
| | | | 3 Hrs. | 6 Hrs. | 12 Hrs. |
| | A | B | C | D | E |
| Batch 24 | 38.4 | 40.9 | 42.3 | 43.3 | 40.6 |

It will be noted from the above table that calcination at 1300° F. to 1400° F. for from 3 to 12 hours gives improved results, with best results at 1400° F. for 3 to 6 hours. The improved results are in the form of higher yields of aromatics. These results are not predictable but the data on repeated runs are firm.

To recapitulate briefly, we have found that insofar as a zinc spinel support for a hydroforming or an aromatization catalyst is concerned, the catalyst composite containing the active catalyst component can be greatly improved as to activity by calcining the catalyst composite prior to use under rather severe conditions for an extended period of time. We do not profess to be able to explain the improvement thus obtained and believe our discovery to be unforeseeable and unobvious.

Another catalyst base was also prepared from the sulfate salts as follows:

The $ZnO.Al_2O_3$ was prepared on the basis of giving a theoretical yield of 25 pounds of finished catalyst. The amount of sodium aluminate solution required when made by the standard procedure described below was calculated to be 57.3 liters. From the alumina and sodium hydroxide content of this solution the required amounts of zinc sulfate and sulfuric acid were calculated.

35.30 pounds of technical zinc sulfate and 986 cc. of concentrated sulfuric acid were dissolved in tap water to give 57.3 liters of solution A. 13 kg. of sodium aluminate were stirred for 15 minutes in 65 liters of tap water. About 6 liters of Hyflo (a diatomaceous earth filter aid) were stirred in and the mixture was filtered with a filter crock. 57.3 liters of the filtrate were taken as solution B.

1 liter of water was stirred in a beaker while 1 liter of solution A and 1 liter of solution B were slowly added, simultaneously and at the same rate. This was a test batch to check concentrations. The acidity of the liquid in the slurry which resulted was tested with p-Hydrion paper and showed a pH of 12.

Since a pH of 11 to 13 is desired for the mix, the large scale preparation was continued without further addition of NaOH to the $NaAlO_2$ solution or $H_2SO_4$ solution.

Two five gallon bottles were calibrated in 2 liter graduations and equipped with siphons. 12 liters of tap water were poured into a 50 gallon barrel and stirred vigorously while solutions A and B were added simultaneously and at the same rate from the calibrated bottles. Addition took one hour.

The slurry formed was tested with p-Hydrion paper. The pH of the liquid portion was 12. Portions of sulfuric acid diluted 20 to 1 were added with stirring until the pH was reduced to 7.5. (350 cc. of concentrated sulfuric acid diluted with 7 liters of tap water were added in all.)

The slurry was then pumped into a filter press containing ten frames, 1″ by 18″ by 18″. At a pressure of 65 pounds per square inch only about seven-eighths of the slurry could be pumped into the press.

The material in the press was washed with 60 gallons of water per hour for 3 hours. It was then air blown for 30 minutes and dumped. The cake was resuspended in tap water in a 50 gallon barrel and left overnight.

The next morning the slurry was again pumped into the ten frame press. This time the press did not fill, indicating shrinkage of the precipitate. The press was washed with tap water at the rate of 150 gallons per hour for 3½ hours. It was then air blown for half an hour and dumped.

The cake was worked into a very thick paste by means of large propeller type stirrers. The water added in this step was kept to a minimum. A solution of 1220 g. of C. P. ammonium molybdate dissolved in 9 liters of tap water was then stirred into the paste to form a thick slurry which was allowed to stand overnight.

The slurry was then dried in an oven with air circulation at 240–400° F. The wet material was stirred occasionally to insure uniformity. The dried product was calcined 3 hours in an electric muffle at 1200° F. and then pilled.

*Note 1.*—The pH's given above were determined with p-Hydrion paper. Checks with a glass electrode pH meter have indicated that the paper values of 12–13 correspond to glass electrode values of approximately 10.5 to 12 and a paper value of 7.5 gives an electrode value of 8.5.

*Note 2.*—Although simultaneous addition of the sodium aluminate and zinc sulfate solutions is the preferred method of precipitation, satisfactory catalysts have been obtained by adding the zinc sulfate solution to the sodium aluminate solution.

Instead of impregnating the base with a molybdenum compound and converting the latter to molybdenum oxide, we may incorporate other well known groups V and VI metal oxides as the active component, such, for example, chromium oxide, by a procedure analogous to that described in Examples 1 to 3 hereof, viz., first impregnating the base with a water soluble chromium salt, preferably ammonium chromate and thereafter converting the chromate to chromic oxide in situ. This catalyst thus prepared from the sulfate salts is also superior when calcined at the temperatures and during the periods previously mentioned, just as in the case where the catalyst was prepared from zinc nitrate. The catalyst prepared from zinc sulfate has an additional advantage in that it is cheaper to manufacture than the catalyst prepared from zinc nitrate.

Furthermore, any conventional hydroforming conditions may be employed which are known in the art. In other words, the temperature during hydroforming may be from 900° to 1150° F., the pressure, 150 to 500 pounds per square inch gauge, the feed rate of naphtha, 0.5 to 2 volumes of oil per volume of catalyst per hour, and the amount of hydrogen, 1,000 to 4,000 cubic feet of hydrogen per barrel of oil fed.

As employed herein, a composite catalyst is a combination of the $ZnAl_2O_4$ base and the active component, e. g., $MoO_3$.

By hydroforming we refer to an operation in which a naphthenic hydrocarbon oil, such as virgin naphtha, is caused to react at elevated temperatures and pressure in the presence of a solid catalyst and added hydrogen under conditions in which there is no net consumption of hydrogen.

Numerous modifications may be made by those skilled in this art without departing from the spirit thereof.

We claim:

1. The method of forming aromatic hydrocarbons which comprises contacting hydrocarbons containing naphthenes at elevated temperatures and pressures with added hydrogen and a composite catalyst consisting essentially of molybdenum oxide supported on a zinc aluminate spinel base, said catalyst having been calcined prior to use at temperatures of about 1400° F. for about 6 hours.

2. The method of hydroforming a virgin naphtha containing naphthenes which comprises contacting said naphtha in a reaction zone in the presence of added hydrogen with a catalyst consisting essentially of molybdenum oxide supported on a zinc aluminate spinel base at temperatures in the range of from about 900° to about 1150° F. while maintaining a pressure of from about 150 to about 500 pounds per square inch and while feeding the naphtha to the reaction zone at a feed rate of from about 0.5 to about 2 volumes of naphtha per volume of catalyst per hour, said catalyst having been calcined at about 1400° F. for about 6 hours prior to use in said hydroforming reaction.

ALBERT B. WELTY, Jr.
CLINTON H. HOLDER.

REFERENCES CITED

The following references are of record in the file of this patent:

UNITED STATES PATENTS

| Number | Name | Date |
|---|---|---|
| 2,278,223 | Sturgeon | Mar. 31, 1942 |
| 2,357,271 | Taylor et al. | Aug. 29, 1944 |
| 2,371,087 | Webb | Mar. 6, 1945 |
| 2,375,402 | Corson et al. | May 8, 1945 |
| 2,376,252 | Hull | May 15, 1945 |
| 2,392,738 | Holder et al. | Jan. 8, 1946 |

FOREIGN PATENTS

| Number | Country | Date |
|---|---|---|
| 406,808 | Great Britain | Mar. 8, 1934 |